Sept. 7, 1926.

C. C. BALDWIN 1,599,196

POWER PROPELLED DEVICE

Filed Dec. 1, 1922 4 Sheets-Sheet 3

Inventor
Curtis C. Baldwin,
by
Wallace R. Lane
Atty.

Inventor:
Curtis C. Baldwin,
by Wallace R. Lane
Atty.

Patented Sept. 7, 1926.

1,599,196

UNITED STATES PATENT OFFICE.

CURTIS C. BALDWIN, OF LA PORTE, INDIANA, ASSIGNOR TO ADVANCE-RUMELY COMPANY, OF LA PORTE, INDIANA, A CORPORATION OF INDIANA.

POWER-PROPELLED DEVICE.

Application filed December 1, 1923. Serial No. 604,286.

This invention relates to power propelled devices, more particularly to the combination of a driven element or elements and a tractor or other power furnishing device, and is especially adapted for and illustrated as applied to a combined harvester thresher.

In its broader aspect my invention comprises a carriage and a tractor flexibly connected together so that either may tilt with relation to the other in passing over uneven ground without interrupting the transmission of power from the tractor to the carriage. In the preferred form the tractor is pivotally mounted at its front end upon the carriage axle, and so connected thereto that the carriage with its load, and the tractor element will each have three points of support, while the combined apparatus as a whole will have four points of support. This arrangement, as will later be more fully understood, gives stability to the device as a whole, while permitting the tractor and the carriage wheels to separately or simultaneously pass over, and conform to the surface of, uneven ground without damage, even though the effect may be to tilt the carriage and tractor in opposite directions. This obviates breakage or undue straining of parts as would occur were the tractor and carriage rigidly connected together, and permits mechanism mounted on the carriage to continue to operate regardless of the contour of the ground being traveled over. The three points of support for the carriage are the two laterally spaced wheels and the connection at the rear of the tractor, while the three points of support for the tractor comprise the two driving wheels and the pivotal connection between the front of the tractor and the carriage axle.

Among the objects of my invention is to so improve the construction and combination of the tractor element and its load being propelled, that they will be sufficiently rigidly connected to permit positive control of the driven device from the tractor element, including steering, the transmission of power, and the like, and at the same time possess sufficient flexibility of connection that the driven device and the driving device or tractor element may pass over uneven ground without damage to the connections, or any of the parts, or interfering with the operation of such mechanism as may be mounted on the driven device; further to provide a three point support for each of the tractor element and the driven unit; further to provide a combined power propelled device, which as a whole has four points of ground support, and two flexibly connected parts each having a three point support; further to combine in a unitary structure a tractor or power supplying element, and a harvester thresher in which the harvesting and threshing mechanism is substantially balanced on two ground supports of their carriage; further to provide a unitary power propelled harvester thresher, in which the tractor or power supplying element is detachably arranged at the side of the harvester thresher carriage so as to be readily detachable therefrom, or attached thereto, and when attached thereto power may be readily transmitted from the tractor or power supplying element to the machinery supported on the carriage; further to provide novel means for permitting a detached tractor to be quickly attached to the carriage; further to provide in such combination a more perfect control than heretofore possible; and such further objects, advantages and capabilities as will later more fully appear.

For further description of some of the details of the tractor operated harvesting thresher shown in the accompanying drawings, I refer to my copending application Serial No. 417,644, filed October 18, 1920, of which this application is a continuation in part.

My invention further resides in the combination, construction and arrangement of parts illustrated in the accompanying drawings, and while I have shown therein preferred embodiments, I wish the same to be understood as illustrative only, and not as limiting my invention, as such embodiments are susceptible of modification and change without departing from the spirit of my invention.

In the drawings:—

Fig. 1 is a plan view of the carriage element with the parts supported thereon, and the main portions of the tractor shown in dotted lines.

Fig. 1ª is a fragmentary detail view showing the flexible connection between the rear of the tractor and the carriage.

Figure 1:
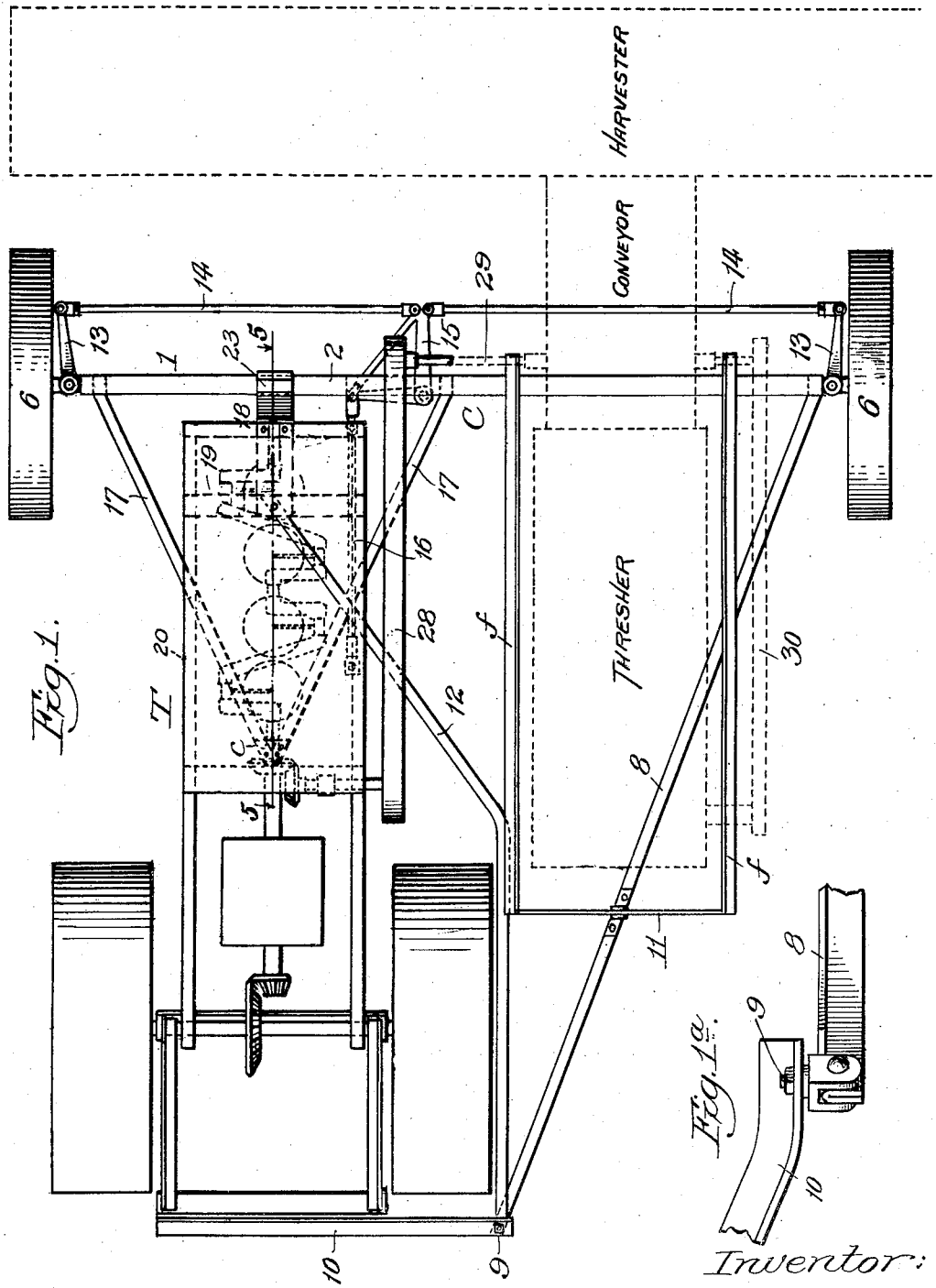
Figure 2:
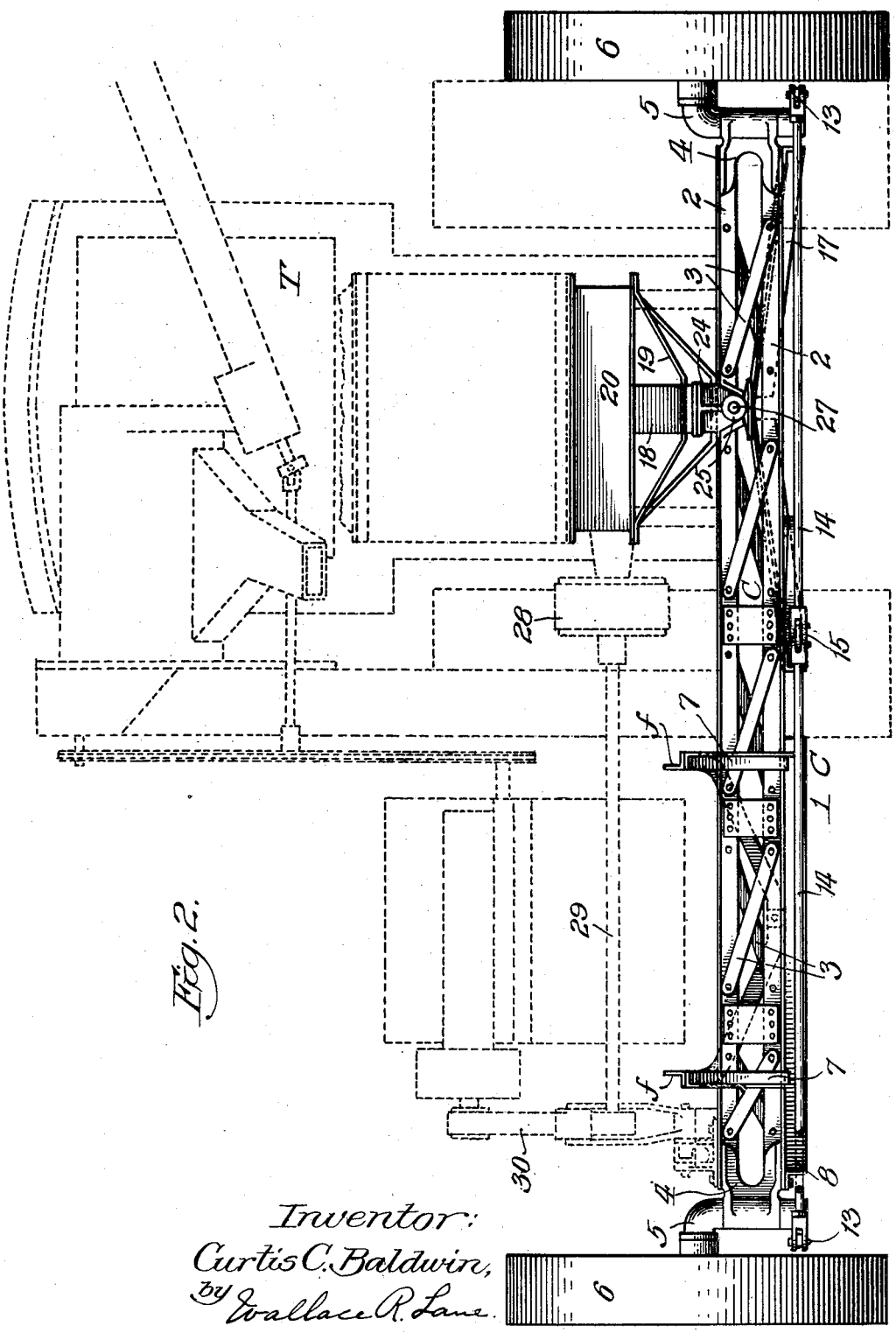
Fig. 2 is a front elevation of the carriage, also showing load supported by the carriage, and the greater part of the tractor, in dotted lines.
Figure 3:
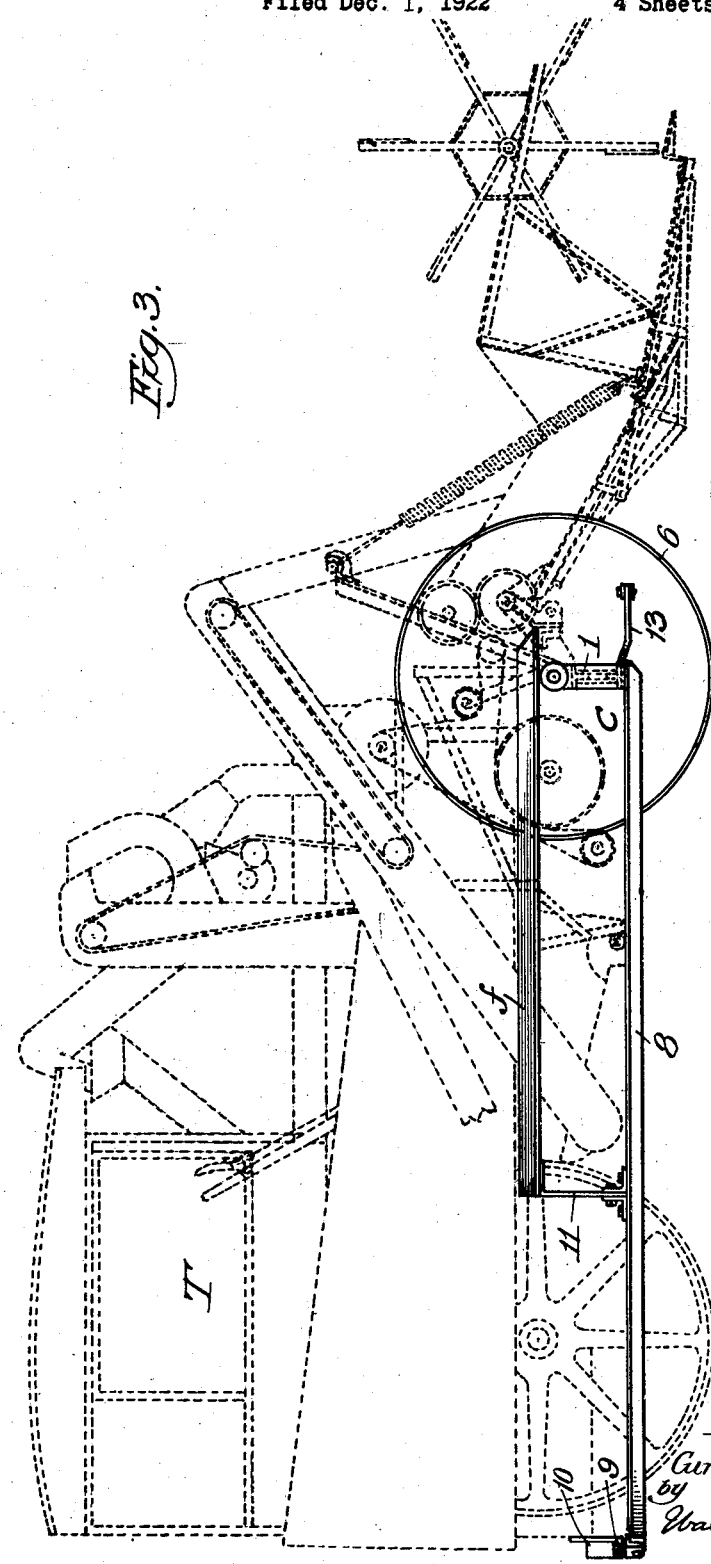
Fig. 3 is a side elevation, the carriage being shown in solid lines, and the tractor and machinery supported on the carriage in dotted lines.
Figure 4:
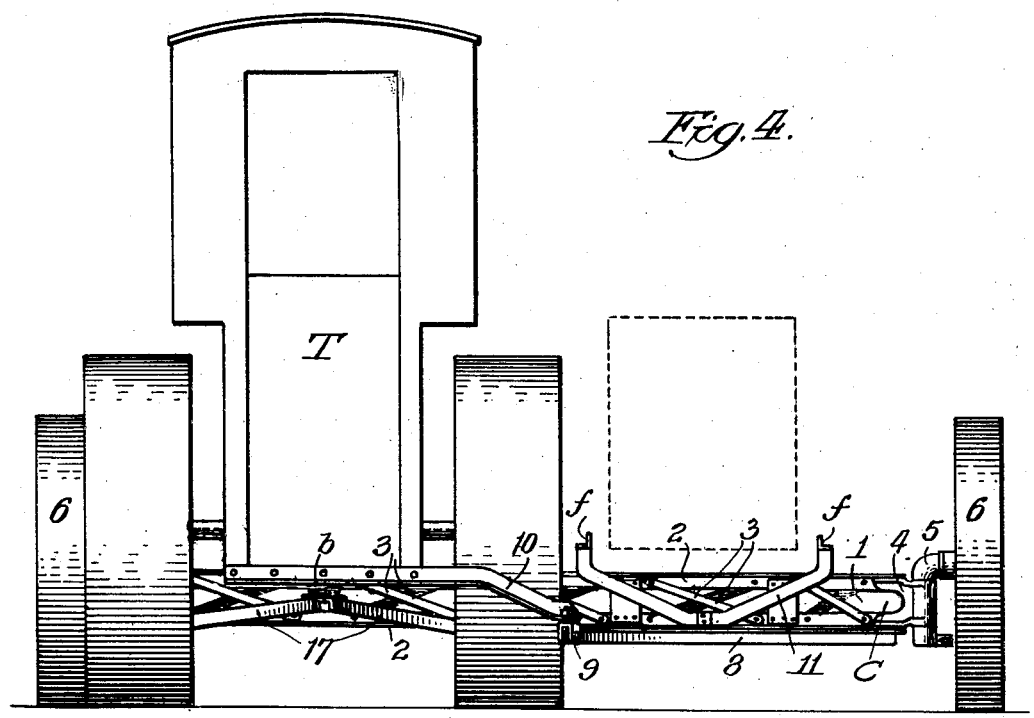
Fig. 4 is a rear elevation.

In the drawings T designates a tractor or other suitable motive power device connected to a load supporting carriage, designated generally at C, in a manner now about to be described. Referring more particularly to Figs. 1-4, the carriage C comprises the axle 1, which in the present instance is made up of spaced T-bars 2, suitably connected by lattice members 3, and carrying at its opposite ends brackets 4, within which are pivotally mounted the stub axles 5, carrying ground supporting wheels 6. It is, of course, understood that axle 1 may be fabricated in various different manners, as desired. As seen in Fig. 2 frame members *f* are supported by straps or other suitable means 7 to axle 1, said members *f* serving as a supporting means for the mechanism to be mounted on the carriage. Also secured adjacent the left hand end (when viewed from the front) of axle 1, as seen in Figs. 1 and 2, is a rearwardly extending brace member 8, which at its rear end is attached by means of a pivotal connection 9, or other suitable detachable flexible means, to the cross bar 10, secured to the rear end of the tractor. Frame members *f* at their rear end have supporting connection with bar 8, through the medium of the V-shaped brace 11. This angle bar 8 may assume other forms, such as a strut, or the like, if desired. Also if desired an additional angular extension brace member 12 may be provided to connect the end of bar 8 at the rear of the tractor, with the forward portion of the tractor or other anchoring point, to form an additional bracing means.

Stub axles 5 are provided with outwardly extending arms 13, to which are pivotally connected the steering links 14, which at their inner ends are pivoted as shown to the bell crank 15, which is pivotally mounted upon axle 1, and is operated by a drag link 16, which may be either a substitution for, or an extension of, the drag link of the tractor. By this it is seen when the tractor is connected to the carriage in the manner described herein, the combined unit may be steered in the same manner, and with the same mechanism as the tractor when operated individually.

As shown in the drawings in dotted lines, the tractor chosen for illustration is one having two driving wheels at the rear. In the form shown in Figs. 1-4 the two forward wheels of the tractor have been removed, and as shown in Fig. 5 the ordinary radius rods have been removed, and special extended radius rods 17 of a length sufficient to reach to and be attached to axle 1, (see aso Fig. 1), substituted therefor, the pivot pin *a* at the rear of the radius rods 17, and the pivotal connection 27 of the forward end of the tractor with the axle 1, being in horizontal alinement, to permit any necessary tilting when the tractor or carriage pass over uneven ground.

Figure 5:
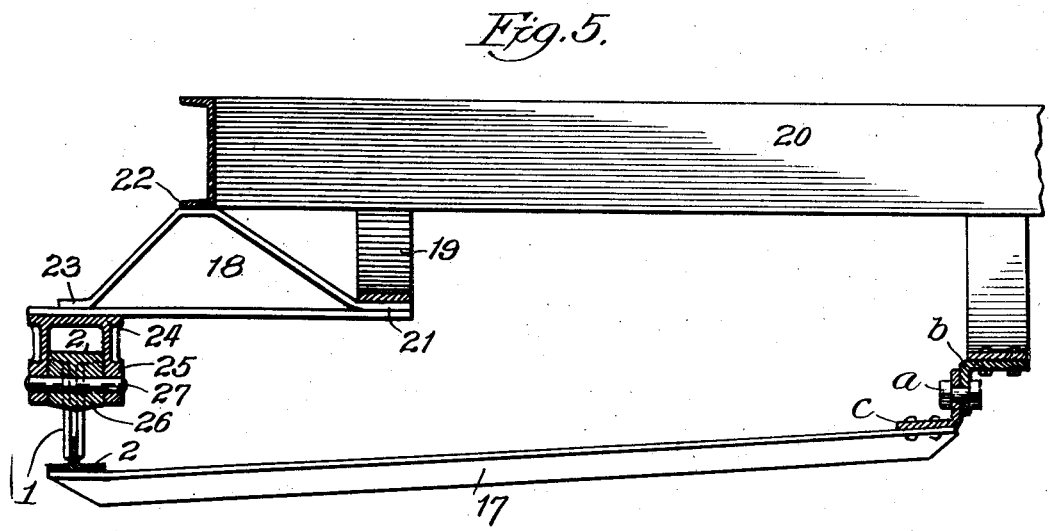
Fig. 5 is a fragmentary, longitudinal, vertical, sectional view on a plane passing through the point of pivotal connection between the front end of the tractor and the carriage axle, and as represented by line 5—5 in Fig. 1 of the drawings.

Referring to Fig. 5, the manner of attaching the tractor to axle 1 may be clearly seen. The front wheels of the tractor and the king pin having been removed, a specially formed strut 18 is attached at its rear end to the lower portion of the downwardly extending cross supporting brace 19, which forms part of the tractor and is attached at its ends to the tractor frame members 20. This strut 18 is attached to the tractor at points 21 and 22, in any suitable manner, and carries at its forward end 23 a specially formed depending yoke member 24, which straddles the upper one of the angle members 2 of axle 1. Formed in the legs of yoke member 24, are bosses 25, having apertures which register with an aperture in a boss 26 formed on the upper angle member 2, and which apertures receive pivot pin 27. This connection, as will be readily seen, permits the tractor to have a swinging movement about pin 27, to accommodate the passage of either the tractor drive wheels or the carriage wheels 6 over uneven ground. The pivotal connection 9 between the carriage and the rear of the tractor readily permits a tilting of these parts with relation to each other in passing over uneven ground. Even were an ordinary bolt substituted for pivotal connection 9, this tilting movement would be permitted due to the inherent resiliency in brace member 8. When it is kept in mind that brace member 8 is virtually the radius of a circle having a point closely adjacent to one of the carriage wheels 6 as a center, it will be appreciated that the connected ends of the angle bars 8 and 10 at the rear of the tractor will be capable of a very considerable up and down movement, without straining or unduly injuring the parts. This bar 8 will also have sufficient rigidity to transmit any thrusts that may fall thereon from the point of connection 9 to the outer end of the carriage 1, such thrusts as pointed out above being also further absorbed by the additional thrust or brace rod 12, when such be added.

The harvester will preferably be positioned in front of and the thresher largely to the rear of the axle 1, with the conveying elevator and other mechanism so distributed as to make the combined weight of these parts substantially balanced upon axle 1, stability being given to the carriage and its load by the connection 9, between the rear of the bar 8 and the rear of the tractor. This connection forms the third point of support for the carriage, the other two being the wheels 6—6. The tractor (when a two driving wheel type is used) will have two points of support between its driving wheels and the ground, the third point of support being the pivotal connection about pin 27, with the carriage axle 1. This construction, therefore, provides, as will be apparent, a full stabilizing support of the combined device upon the ground with three points of support for each of the tractor and carriage elements. The importance of this feature will be evident, since it will be possible to drive this combined device anywhere in the field, even though the slope of the ground may be different at the carriage wheels 6, and the driving wheels of the tractor. The connections described amply take care of and furnish sufficient flexibility to absorb any tilting movement of either of the carriage or tractor elements, at the same time permitting complete operation of both.

Also with this arrangement the farm tractor may be used separately for ordinary tractor work by merely disconnecting the same from the carriage and applying to it in the usual manner its forward supporting wheels, or if disconnected may be readily connected in combination with the carriage. This makes the tractor free for separate use as a tractor during those portions of the year when its joint work with the machinery mounted on the carriage is not required.

Power will be transmitted from the usual pulley wheel of the tractor through a suitable belt 28, to a main shaft 29, mounted on the carriage, and from which main shaft power may be taken off to any part of the mechanism desired, as for example, through belt 30, to run the thresher or other mechanism. It is thus apparent that power may be provided by the tractor not only for propelling the combined device over the ground, but also for operating the harvester, conveyor, elevator, thresher, or such other mechanism as desired.

Since the weight of the carried parts, in the form shown in Figs. 1–4, is substantially balanced upon axle 1, very little weight need be carried by the diagonal rearwardly extending brace 8. However, this brace will be of such construction as to practically take care of any thrusts that may be transmitted therethrough, and any weights that may be thrown thereon.

While the type of tractor illustrated is shown as having two drive wheels, it will be readily understood that the invention could if desired be carried out with a tractor having other forms of ground support, such as a single wide faced rear driving wheel, or the like, which would in effect form a two point support with the ground. Also other forms of support might be substituted for the carriage wheel, such as skids or runners for snow, ice, or the like. It is further apparent that other forms of framing or connecting devices may be used for transferring the weight of the load carried to the carriage axle, and in some instances it might be desirable that the load may of itself form the equivalent of a frame such, for example, as when a metal tank or other rigid structure is mounted on the carriage. The power for operating the mechanism supported by the carriage might also be supplied from a source of motive power carried thereby, such as a self-contained power plant, motor, or the like.

Having now described my invention, I claim:—

1. In combination a carriage having a wheeled axle at the forward portion thereof, a tractor having a wheeled axle at the rear portion thereof, means comprising a pivotal joint for connecting the front of the tractor to the carriage axle, and a flexible connection between the carriage and the tractor at a point remote from the carriage wheels.

2. In combination a carriage having ground engaging means providing two points of support therefor, a power driven tractor element having traction wheels providing two points of ground support, means on said carriage adjacent one side thereof providing a third point of support for said tractor element, and means on said tractor element providing a third point of support for said carriage.

3. In combination a carriage comprising a wheeled axle having load supporting means thereon, of a power driven tractor element arranged to the rear of said axle, traction wheels for supporting the rear end of said tractor element, means pivotally connecting the front end of said tractor element to said axle, and further means flexibly connecting said carriage with said tractor element.

4. In combination a carriage and a power driven tractor, the carriage having a wheeled axle at the forward portion thereof, the tractor having a wheeled axle at the rear portion thereof, means for connecting the front of the tractor to the carriage axle, and means for connecting the rear of the carriage to the rear of the tractor.

5. In combination a carriage comprising a frame, wheels supporting said frame at an intermediate portion thereof, a power driven tractor element arranged at the side of said frame, traction means supporting the rear end of said tractor element, means pivotally connecting the front end of said tractor element to said carriage, and means flexibly connecting the respective rear ends of said carriage and said tractor element.

6. In combination a carriage comprising an axle having supporting wheels, a frame mounted on said axle, a portion of the frame being located substantially at one side of the longitudinal center line of the carriage, and extending to the rear of said axle, a power driven tractor located at the side of said portion of the frame and to the rear of said axle, means connecting the rearwardly extending portion of the frame to the rear of the tractor, and means connecting the front end of the tractor to said axle.

7. In combination a carriage comprising an axle having wheels affording two points of support for said carriage, a load supporting means on said axle, a tractor arranged in the rear of said axle substantially at one side of the longitudinal center line of said carriage, said tractor having two points of ground support at its rear, means pivotally supporting the forward portion of said tractor from said axle, and means flexibly supporting said carriage and its load from said tractor element at a point remote from said carriage wheels.

8. In a harvester thresher, in combination, a load carrying frame having a pair of spaced ground wheels and a member provided with a free end located at a distance from said wheels, a tractor arranged at one side of a portion of said frame, traction members on said tractor element providing two points of ground support, means pivotally supporting said tractor element from said frame at a point remote from said traction members, and means flexibly supporting the free end of said frame member from said tractor element.

9. In a harvester thresher in combination, a carriage adapted to support the harvester thresher mechanism and comprising an axle and wheels thereon, a member rigidly connected to said axle and having an outer end located at a point remote from said axle, a tractor element arranged at the side of said member and having ground supports near the outer end of said member, means pivotally supporting the tractor element from said carriage at a point remote from the points of ground support of said tractor, and means flexibly supporting the outer end of said member from said tractor element.

10. In combination a carriage having a load supporting framework thereon, an axle, wheels on said axle providing two points of support for said framework, said framework having an extending member with a free end located at a point distant from said wheels, said member affording a flexible connection between the carriage and a tractor element, and means on said axle adapted to provide a pivotal support for a tractor element.

11. In combination an axle having a pair of spaced supporting wheels, a frame on said axle having a portion thereof located substantially at one side of the midpoint of the axle and extending therefrom, a member rigidly connected to said axle and partially supporting said portion of the frame, said member extending beyond said frame and having an outer end adapted to be connected to a tractor element, to form a flexible connection between said tractor and carriage, and means on said axle adapted to provide a pivotal support for a tractor element.

12. In combination an axle having a pair of supporting wheels, a frame mounted on said axle and having a portion thereof extending to the rear of said axle substantially at one side of the midpoint of said axle, a member rigidly connected to said axle and partially supporting said rearwardly extending portion of the frame, said member having an outer end adapted to be connected to a tractor element to flexibly support said frame therefrom, and means on said axle adapted to provide a pivotal support for a tractor element.

13. In combination a carriage having a wheeled axle at the forward portion thereof, a tractor having a wheeled axle at the rear portion thereof, means comprising a pivotal joint for connecting the front of the tractor to the carriage axle, and a flexible connection between the carriage and the rear of the tractor, the carriage wheels being pivotally mounted on the axle and connected to steering mechanism, and having means for connecting said steering mechanism to operating mechanism on the tractor.

14. In a power-driven device a carriage having an axle supported on a pair of ground wheels, a member mounted on said carriage and extending to the rear thereof, a tractor element positioned to one side of the rear portion of said member and to the rear of said axle, and means connecting said tractor element, carriage and member so as to permit either or both the carriage or tractor element to tilt with relation to the other in passing over uneven ground.

15. In a power-driver device a carriage having an axle supported on a pair of ground wheels, a member mounted on said carriage and extending to the rear thereof, a tractor element positioned to one side of the rear portion of said member and to the rear of said axle, and means connecting said tractor element, carriage and member so as to permit either or both the carriage or tractor element to tilt with relation to the other in passing over uneven ground, said means preventing any substantial sidewise movement of the tractor element and carriage with relation to each other.

16. In a power propelled device a carriage comprising an axle mounted upon a pair of ground wheels, and a rearwardly extending member, a tractor element having a pair of ground wheels supporting its rear portion, and means connecting said tractor element and carriage to permit tilting of one with relation to the other and prevent any longitudinal swinging of the same with relation to each other.

17. In a power propelled device in combination a carriage having ground supporting wheels and a rearwardly extending portion, a tractor element having a pair of ground supporting wheels adjacent its rear end, a forwardly extending strut member adapted to be applied to the frame of the tractor after the front wheels have been removed, a depending element secured to the front of said strut member, and means pivotally connecting said depending member with the axle of said carriage at one side of the center line of the carriage.

18. In a power propelled device in combination a carriage having ground supporting wheels and a rearwardly extending portion, a tractor element having a pair of ground supporting wheels adjacent its rear end, a forwardly extending strut member adapted to be applied to the frame of the tractor after the front wheels have been removed, a depending element secured to the front of said strut member, means pivotally connecting said depending member with the axle of said carriage at one side of the center line of the carriage, and a pair of extended radius rods adapted to be substituted for the normal tractor radius rods and extending forwardly and secured to said axle.

19. In a power propelled device in combination a carriage having ground supporting wheels and a rearwardly extending portion, a tractor element having a pair of ground supporting wheels adjacent its rear end, a forwardly extending strut member adapted to be applied to the frame of the tractor after the front wheels have been removed, a depending element secured to the front of said strut member, means pivotally connecting said depending member with the axle of said carriage at one side of the center line of the carriage, a pair of extended radius rods adapted to be substituted for the normal tractor radius rods and extending forwardly and secured to said axle, stub axles on said carriage wheels pivotally connected to said carriage, lever arms extending from said stub axles, a bell crank pivoted to said axle intermediate of the ends thereof, connecting links between said bell crank and said lever arms, and an extended drag link adapted to be substituted for a normal tractor drag link, and extending forward and pivotally connected to said bell crank, whereby the combined device can be steered from the steering mechanism of the tractor.

20. In a power propelled combined harvester thresher apparatus, a carriage comprising an axle having a pair of ground wheels, and a framework for supporting the harvesting and threshing mechanism, a rearwardly extending member secured adjacent one end of said axle, the rear end of the thresher being partially supported on said member, a tractor positioned to one side of said thresher and having at its rear end a transversely extending member, to one end of which is attached the rear end of said rearwardly extending member, a forwardly extending strut adapted to be attached to the lower front portion of the tractor frame upon removal of the front wheels thereof, a depending yoke on the front of said strut, and a pivotal connection between said yoke and said axle, said pivotal connection and the arrangement of the rearwardly extending member and its connection with the rear of the tractor permitting a tilting movement of the carriage and the tractor with relation to each other, when passing over uneven ground.

21. In a power propelled combined harvester thresher apparatus, a carriage comprising an axle having a pair of ground wheels, and a framework for supporting the harvesting and threshing mechanism, a rearwardly extending member secured adjacent one end of said axle, the rear end of the thresher being partially supported on said member, a tractor positioned to one side of said thresher and having at its rear end a transversely extending member, to one end of which is attached the rear end of said rearwardly extending member, a forwardly extending strut adapted to be attached to the lower front portion of the tractor frame upon removal of the front wheels thereof, a depending yoke on the front of said strut, and a pivotal connection between said yoke and said axle, said pivotal connection and the arrangement of the rearwardly extending member and its connection with the rear of the tractor permitting a tilting movement of the carriage and the tractor with relation to each other, when passing over uneven ground, and power transmitting connections for transmitting power from the tractor for operating the harvester thresher mechanism.

22. In a power propelled harvester thresher a carriage comprising an axle and a frame for supporting the harvesting and threshing mechanism upon said axle, ground wheels on said axle, a rearwardly extending member secured at one end of said axle and having supporting connection with the rear end of the thresher, a tractor element secured alongside of said thresher and having pivotal connection with said axle, the rear end of said rearwardly extending member being connected to the rear of said tractor element so that the carriage and the tractor may have tilting movement with relation to each other, and a forwardly extending brace member extending from the rear of said rearwardly extending member and secured adjacent the forward end of said tractor element.

23. In a power propelled harvester thresher, a tractor element, a carriage adapted to support harvesting and threshing machinery, a pivotal connection between said tractor element and said carriage, and a further connection therebetween of a flexible nature, so that said element and carriage may tilt with relation to each other in passing over uneven ground, and be held against any substantial sidewise swinging movement with relation to each other.

In witness whereof, I hereunto subscribe my name to this specification.

CURTIS C. BALDWIN.